United States Patent
Chavez et al.

(10) Patent No.: US 7,489,687 B2
(45) Date of Patent: Feb. 10, 2009

(54) EMERGENCY BANDWIDTH ALLOCATION WITH AN RSVP-LIKE PROTOCOL

(75) Inventors: David L. Chavez, Thornton, CO (US); Christopher R. Gentle, Camperdown (AU)

(73) Assignee: Avaya. Inc., Basking Ridge, NJ (US)

( * ) Notice: Subject to any disclaimer, the term of this patent is extended or adjusted under 35 U.S.C. 154(b) by 1028 days.

(21) Appl. No.: 10/109,784

(22) Filed: May 31, 2002

(65) Prior Publication Data
US 2003/0223431 A1 Dec. 4, 2003

Related U.S. Application Data
(60) Provisional application No. 60/372,180, filed on Apr. 11, 2002.

(51) Int. Cl.
*H04L 12/28* (2006.01)
*H04L 12/56* (2006.01)
(52) U.S. Cl. .................. 370/392; 370/389; 379/45
(58) Field of Classification Search ............ 370/384, 370/351, 352, 480, 445, 446, 461, 462, 428, 370/486, 345.1, 235, 236, 252, 254
See application file for complete search history.

(56) References Cited

U.S. PATENT DOCUMENTS

| | | | |
|---|---|---|---|
| 4,791,660 A | 12/1988 | Oye et al. | |
| 5,067,127 A * | 11/1991 | Ochiai | ........................ 370/238 |
| 5,206,903 A | 4/1993 | Kohler et al. | |
| 5,506,872 A | 4/1996 | Mohler | |
| 5,594,740 A | 1/1997 | LaDue | ........................ 455/410 |
| 5,604,786 A | 2/1997 | Engelke et al. | |
| 5,724,405 A | 3/1998 | Engelke et al. | |
| 5,802,058 A | 9/1998 | Harris et al. | |
| 5,828,747 A | 10/1998 | Fisher et al. | |
| 5,905,793 A | 5/1999 | Flockhart et al. | |
| 5,933,425 A | 8/1999 | Iwata | |
| 5,946,618 A | 8/1999 | Agre et al. | ................... 455/428 |
| 5,953,312 A | 9/1999 | Crawley et al. | |
| 5,961,572 A | 10/1999 | Craport et al. | .............. 701/207 |

(Continued)

FOREIGN PATENT DOCUMENTS

WO WO 91/14278 9/1991

(Continued)

OTHER PUBLICATIONS

PacketCable, Cable Labs, http://www.packetcable.com, copyright 2000-2002.

(Continued)

*Primary Examiner*—Ajit Patel
(74) *Attorney, Agent, or Firm*—Sheridan Ross P.C.

(57) ABSTRACT

A source node for configuring and transmitting packets is provided that comprises (a) a reservation agent 204 configured to assign to a first packet a preemption level causing at least some routers in the distributed processing network to process the first packet differently than other packets not having the preemption level, (b) a preemption map 208 comprising a plurality of preemption levels (each preemption level being associated with predetermined level identification criteria), and/or (c) sender-specific information 212 associated with a sender. The reservation agent 204 can configure and transmit packets containing a preemption level and/or sender-specific information.

36 Claims, 5 Drawing Sheets

U.S. PATENT DOCUMENTS

| | | | |
|---|---|---|---|
| 5,982,873 | A | 11/1999 | Flockhart et al. |
| 6,002,933 | A | 12/1999 | Bender et al. |
| 6,021,178 | A | 2/2000 | Locke et al. |
| 6,038,214 | A | 3/2000 | Shionozaki |
| 6,058,163 | A | 5/2000 | Pattison et al. |
| 6,067,300 | A | 5/2000 | Baumert et al. |
| 6,073,013 | A | 6/2000 | Agre et al. ............ 455/428 |
| 6,088,732 | A | 7/2000 | Smith et al. |
| 6,122,665 | A | 9/2000 | Bar et al. |
| 6,163,607 | A | 12/2000 | Bogart et al. |
| 6,173,053 | B1 | 1/2001 | Bogart et al. |
| 6,185,527 | B1 | 2/2001 | Petkovic et al. |
| 6,192,122 | B1 | 2/2001 | Flockhart et al. |
| 6,249,757 | B1 | 6/2001 | Cason |
| 6,256,300 | B1 | 7/2001 | Ahmed et al. |
| 6,374,302 | B1 | 4/2002 | Galasso et al. |
| 6,381,472 | B1 | 4/2002 | LaMedica, Jr. et al. |
| 6,381,639 | B1 | 4/2002 | Thebaut et al. |
| 6,421,425 | B1 | 7/2002 | Bossi et al. |
| 6,463,470 | B1 | 10/2002 | Mohaban et al. |
| 6,463,474 | B1 | 10/2002 | Fuh et al. |
| 6,490,343 | B2 | 12/2002 | Smith, Jr. et al. |
| 6,502,131 | B1 | 12/2002 | Vaid et al. |
| 6,526,140 | B1 | 2/2003 | Marchok et al. |
| 6,529,475 | B1 | 3/2003 | Wan et al. |
| 6,529,499 | B1 | 3/2003 | Doshi et al. |
| 6,532,241 | B1 | 3/2003 | Ferguson et al. |
| 6,546,082 | B1 | 4/2003 | Alcendor et al. |
| 6,578,077 | B1 | 6/2003 | Rakoshitz et al. |
| 6,601,101 | B1 | 7/2003 | Lee et al. |
| 6,647,270 | B1* | 11/2003 | Himmelstein ............ 455/456.1 |
| 6,668,042 | B2 | 12/2003 | Michaelis |
| 6,678,250 | B1 | 1/2004 | Grabelsky et al. |
| 6,725,128 | B2 | 4/2004 | Hogg et al. |
| 6,754,710 | B1 | 6/2004 | McAlear |
| 6,760,312 | B1 | 7/2004 | Hitzeman |
| 6,760,774 | B1 | 7/2004 | Soumiya et al. |
| 6,765,905 | B2 | 7/2004 | Gross et al. |
| 6,778,534 | B1 | 8/2004 | Tal et al. |
| 6,798,751 | B1 | 9/2004 | Voit et al. |
| 6,807,564 | B1* | 10/2004 | Zellner et al. ............ 709/206 |
| 6,857,020 | B1 | 2/2005 | Chaar et al. |
| 6,954,435 | B2 | 10/2005 | Billhartz et al. |
| 6,964,023 | B2 | 11/2005 | Maes et al. |
| 6,973,033 | B1 | 12/2005 | Chiu et al. |
| 6,988,133 | B1 | 1/2006 | Zavalkovsky et al. |
| 7,003,574 | B1 | 2/2006 | Bahl |
| 7,010,097 | B2* | 3/2006 | Zellner et al. ............ 379/45 |
| 7,010,581 | B2 | 3/2006 | Brown et al. |
| 7,031,311 | B2 | 4/2006 | MeLampy et al. |
| 7,031,327 | B2 | 4/2006 | Lu |
| 7,046,646 | B2 | 5/2006 | Kilgore |
| 7,075,922 | B2 | 7/2006 | Mussman et al. |
| 7,076,540 | B2 | 7/2006 | Kurose et al. |
| 7,076,568 | B2 | 7/2006 | Philbrick et al. |
| 7,099,440 | B2 | 8/2006 | Michaelis |
| 7,103,542 | B2 | 9/2006 | Doyle |
| 7,124,205 | B2 | 10/2006 | Craft et al. |
| 7,170,977 | B2 | 1/2007 | Doherty et al. |
| 7,212,969 | B1 | 5/2007 | Bennett |
| 7,257,120 | B2 | 8/2007 | Saunders et al. |
| 7,260,439 | B2 | 8/2007 | Foote et al. |
| 7,359,979 | B2 | 4/2008 | Gentle et al. |
| 7,362,745 | B1 | 4/2008 | Cope et al. |
| 2001/0039210 | A1 | 11/2001 | Denis ............ 463/42 |
| 2002/0073232 | A1 | 6/2002 | Hong et al. |
| 2002/0085703 | A1 | 7/2002 | Proctor |
| 2002/0091843 | A1 | 7/2002 | Vaid |
| 2002/0105911 | A1 | 8/2002 | Pruthi et al. |
| 2002/0143971 | A1 | 10/2002 | Govindarajan et al. |
| 2002/0152319 | A1 | 10/2002 | Amin et al. |
| 2002/0176404 | A1* | 11/2002 | Girard ............ 370/352 |
| 2003/0002650 | A1 | 1/2003 | Gruchala |
| 2003/0016653 | A1 | 1/2003 | Davis |
| 2003/0033428 | A1 | 2/2003 | Yadav |
| 2003/0086515 | A1 | 5/2003 | Trans et al. |
| 2003/0120789 | A1 | 6/2003 | Hepworth et al. |
| 2003/0185217 | A1* | 10/2003 | Ganti et al. ............ 370/395.5 |
| 2003/0223431 | A1 | 12/2003 | Chavez et al. |
| 2003/0227878 | A1 | 12/2003 | Krumm-Heller |
| 2004/0073641 | A1 | 4/2004 | Minhazuddin et al. |
| 2004/0073690 | A1 | 4/2004 | Hepworth et al. |
| 2005/0058261 | A1 | 3/2005 | Baumard |
| 2005/0064899 | A1 | 3/2005 | Angelopouloset et al. |
| 2005/0180323 | A1 | 8/2005 | Beightol et al. |
| 2005/0186933 | A1 | 8/2005 | Trans |
| 2005/0278148 | A1 | 12/2005 | Bader et al. |
| 2006/0067486 | A1* | 3/2006 | Zellner et al. ............ 379/45 |
| 2006/0069779 | A1 | 3/2006 | Sundqvist et al. |
| 2007/0103317 | A1* | 5/2007 | Zellner et al. ............ 340/573.1 |
| 2007/0133403 | A1 | 6/2007 | Hepworth et al. |
| 2008/0151886 | A1 | 6/2008 | Gentle et al. |
| 2008/0151898 | A1 | 6/2008 | Gentle et al. |
| 2008/0151921 | A1 | 6/2008 | Gentle et al. |

FOREIGN PATENT DOCUMENTS

| | | |
|---|---|---|
| WO | WO 98/46035 | 10/1998 |
| WO | WO 99/51038 | 10/1999 |
| WO | WO 00/41090 | 7/2000 |
| WO | WO 01/26393 | 4/2001 |
| WO | WO 01/75705 | 10/2001 |
| WO | WO 02/00316 | 1/2002 |

OTHER PUBLICATIONS

Schulzrinne. Providing Emergency Call Services for SIP-based Internet Telephony, http//www.softarmor.com/sipping/drafts/draft-schulzrinne-sip-911-00.txt., Jul. 13, 2000, pp. 1-13.

Carlberg, Ken. Internet Engineering Task Force, Framework for Supporting IEPS in IP Telephony, http://www.iepscheme.net/docs/draft-carlberg-ieps-framework-01.tex, Jul. 4, 2001, pp. 1-24.

Brown, I. Internet Engineering Task Force, Securing Prioritised Emergency Traffic, http://www.iepscheme.net/docs/draft-brown-ieps-sec-00.txt, Jul. 5, 2001, pp. 1-12.

International Emergency Preference Scheme (IEPS), http://www.iepscheme.net/, Jun. 16, 2000, pp. 1-2.

Government Emergency Telecommunications Service (GETS), "White Paper on IP Teleponhy A Roadmap to Supporting GETS in IP Networks," Apr. 27, 2000, Science Applications International Corporation, pp. 1-32.

Cisco Systems, "Cisco Emergency Responder Version 1.1 Data Sheet" (Oct. 2001), 5 pages, copyright 1992-2001.

Application Note, Emergency 911 In Packet Networks, http:www.fastcomm.com/NewWeb/solutions/e911.html, Sep. 5, 2001, FastComm Communications Corporation, 3 pgs.

Benjamin W. Wah, et al., "A Survey of Error-Concealment Schemes for Real-Time Audio and Video Transmissions over the Internet," Department of Electrical and Computer Engineering and the Coordinate Science Laboratory, University of Illinois at Urbana-Champaign, Proc. IEEE Int'l Symposium on Multimedia Software Engineering, Dec. 2000.

Ejaz Mahfuz, "Packet Loss Concealment for Voice Transmission Over IP Networks" (2001) (Master thesis, Department of Electrical Engineering, McGill University) (on file with author).

Geeta Desai Chennubhotla, "Embedded Systems: Rough start, but voice market growing," EE Times, at http://www.eetimes.com/in_focus/embedded_systems/EOG20020503S0067 (May 6, 2002).

Grigonis, Computer Telephony Encyclopedia, pp. 268-277 (2000).

IEEE Standards for Information Technology—Telecommunications and information exchange between systems—Local and metropolitan area networks—Common specifications—Part 3: Media Access Control (MAC) Bridges, LAN/MAN Standards Committee of the IEEE Computer Society, ANSI/IEEE Std 802.1D (1998).

IEEE Standards for Local and Metropolitan Area Networks: Virtual Bridged Local Area Networks, The Institute of Electrical and Electronics Engineers, IEEE Std 802.1Q-1998 (Mar. 8, 1999).

International Engineering Consortium, "Silence Suppression and Comfort Noise Generation" at http://www.iec.org/online/tutorials/voice_qual/topic07.html (Jul. 1, 2002).

International Telecommunication Union; "General Aspects of Digital Transmission Systems: Coding of Speech at 8kbit/s Using Conjugate-Structure Algebraic-Code-Excited Linear-Prediction" (CS-ACELP) ITU-T Recommendation G.729 (Mar. 1996).

J. Heinanen et al., "Assured Forwarding PHB Group," Network Working Group, Category: Standards Track (Jun. 1999).

K. Nichols, Cisco Systems, RFC 2474, Definition of Differentiated Services Field in IPv4 & IPv6 Headers, Dec. 1998.

Kathy Lynn Hewitt, Desktop Video Conferencing: A Low Cost and Scalable Solution to Distance Education, "Chapter 2—Internet Conferencing Protocols" thesis submitted to North Carolina State University (1997), at http://www2.ncsu.edu/eos/service/ece/project/succeed_info/klhewitt/thesis/toc.html.

Paul Roller Michaelis, "Speech Digitization and Compression", Int'l Encyclopedia of Ergonomic and Human Factors (W. Warkowski ed., Taylor & Francis 2001).

Peter Parnes, "Real-time Transfer Protocol (RTP)" (Sep. 8, 1997), at www.cdt.luth.se/~peppar/docs/lic/html/node166.html.

Sangeun Han et al., "Transmitting Scalable Video over a DiffServ network," EE368C Project Proposal (Jan. 30, 2001).

TechTarget, "voice activation detection," at http://searchnetworking.te...m/sDefinition/0,,sid7_gci342466.00.html (Jul. 1, 2002).

V. Jacobson et al., "An Expedited Forwarding PHB," Network Working Group, Category: Standards Track (Jun. 1999).

"Packet Loss and Packet Loss Concealment Technical Brief," Nortel Networks at http://www.nortelnetworks.com (2000).

"Telogy Networks' Voice Over Packet White Paper," Telogy Networks, Inc., available at http://www.telogy.com/our_products/golden_gateway/VOPwhite.html (Jan. 1998).

"Voice over packet: An assessment of voice performance on packet networks white paper," Nortel Networks, Publication No. 74007.25/09-01, at http://www.nortelnetworks.com (2001).

"Access for 9-1-1 and Telephone Emergency Services," American with Disabilities Act, U.S. Department of Justice (Jul. 15, 1998), available at http://www.usdoj.gov/crt/ada/911ta.htm, 11 pages.

Schulzrinne, "Emergency Call Services for SIP-based Internet Telephony," Internet Engineering Task Force (Mar. 25, 2001), pp. 1-17.

RADVision, "SIP: Protocol Overview," (2001), pp. 1-16.

Floyd et al., "Random Early Detection Gateways for Congestion Avoidance". IEEE/ACM Transaction on Networking, Aug. 1993, 22 pages.

Baker (Editor), "Requirements for IP Version 4 Routers", RFC 1812, Jun. 1995, 175 pages.

Braden et al. "Resource ReSerVation Protocol (RSVP)", RFC 2205, Sep. 1997, 6 pages.

Wroclawski, "The use of RSVP with IETF Integrated Services", RFC 2210, Sep. 1997, 31 pages.

Nichols et al., "Definition of the Differentiated Services Field (DS Field) in the Ipv4 and Ipv6 Headers", RFC 2474, Dec. 1998, 19 pages.

Blake et al. "An Architecture for Differentiated Services", RFC 2475, Dec. 1998, 34 pages.

Handley et al., "SIP: Session Initiation Protocol", RFC 2543, Mar. 1999, 81 pages.

Herzog et al., "COPS Usage for RSVP", RFC 2749, Jan. 2000, 16 pages.

Bernet, "Format of the RSVP DCLASS Object", RFC 2996, Nov. 2000, 9 pages.

Bernet et al., "Specification of the Null Service Type", RFC 2997, Nov. 2000, 12 pages.

Berney et al., "A Framework for Integrated Services Operation over Diffserv Networks", RFC 2998, Nov. 2000, 29 pages.

Chan et al., "COPS Usage for Policy Provisioning (COPS-PR)", RFC 3084, Mar. 2001, 32 pages.

McCloghrie et al., "Structure of Policy Provisioning Information (SPPI)", RFC 3159, Aug. 2001, 38 pages.

Itu, "Packet-based multimedia communications systems", H. 323, Feb. 1998, 125 pages.

"PacketCableTM Dynamic Quality-of-Service Specification" PKT-SP-DQOS-102-000818, 2000, Cable Television Laboratories, Inc., 211 pages.

* cited by examiner

EMERGENCY BANDWIDTH ALLOCATION WITH AN RSVP-LIKE PROTOCOL

CROSS REFERENCE TO RELATED APPLICATION

The present application claims the benefits under 35 U.S.C. § 119(e) of U.S. Provisional Application Ser. No. 60/372,180, of the same title, filed Apr. 11, 2002, to Chavez and Gentle, which is incorporated herein by reference in its entirety.

FIELD OF THE INVENTION

The present invention is directed generally to distributed processing networks and specifically to voice communication in distributed processing networks.

BACKGROUND OF THE INVENTION

Distributed processing networks are being increasingly used for live voice communications between network nodes using Voice over IP or VoIP technology. Distributed processing networks are typically designed to provide a quality of service described as Best Effort or BE that does not discriminate between services and does not control service access or quality. Voice telephony depends upon reliable, low latency, real-time delivery of audio data that BE-based networks cannot consistently provide. To emulate the high quality of service offered by traditional circuit-switched voice telephony networks, the IEFT has published RFC 2205, namely the Resource Reservation Protocol or RSVP, which signals an application's quality of service requirements to the data network over which packets are sent. RSVP allows an endpoint to negotiate with an RSVP-capable network to allocate protected resources for traffic flow that the endpoint will generate. RSVP thereby is able to provide a guaranteed quality of service for a VoIP session.

An illustration of the operation of the RSVP protocol is depicted in FIG. 1. The sender 100 who is initiating the VoIP communication initially sends a path request message addressed to the receiver 104. The path request message or path message conveys the requested traffic specification to all RSVP-aware network nodes on the path and to the receiver. Each RSVP-aware router 108 and 112 in the path 116 between the sender 100 and receiver 104 makes a soft reservation (which will time out if it is not used), establishes a record of the previous RSVP aware node the path message came from, and composes information relating to the quality of service (QoS) characteristics (e.g., minimum supported MTU size, minimum supported bandwidth, and minimum path latency) that it is able to offer. When received, the receiver 104 examines the path message and the gathered path data before deciding to make a reservation. When the reservation is acceptable, the receiver 104 transmits a reservation or Resv message to install the reservation at each router 108 and 112 on the path. The resv message is relayed hop-by-hop in reverse order that the path message took back to the sender 100. Each router 108 and 112 verifies through admission control that the reservation may be installed. In response to the resv message, the sender 100 sends a path tear message that tears down existing reservations at all intermediate nodes in the path, namely routers 108 and 112, to construct the communication path between the sender 100 and the receiver 104. As will be appreciated, synchronized RSVP reservations are uni-directional and reservations are set in both the forward and reverse directions. The forward and reverse reservation routes can traverse different sets of routing nodes.

A problem with VoIP technology is that the technology does not have the reliability of circuit-switched telephony in guaranteeing the availability of network resources for specific types of calls. For example, a caller dialing an emergency number (in the U.S. the emergency number is 911 and in Australia 000) over a VoIP network can encounter a number of obstacles. First, some VoIP networks establish calls regardless of the success of an RSVP path or reservation request. In such networks, the call may be placed but the RSVP capable network may not be able to allocate protected bandwidth for the call. Audio quality under these circumstances may be so poor that the emergency caller and Public Safety Access Point or PSAP cannot communicate with the caller. In this scenario, the emergency call is placed so that the PSAP is aware of an emergency but information about the type and nature of the emergency cannot be communicated. Second, some VoIP networks may not allow calls to proceed if the RSVP path or reservation requests fail. The call may be rejected by the RSVP network to protect existing RSVP-protected traffic resulting in an emergency call being prevented by a lack of network resources. In this scenario, the call cannot be placed, and the PSAP is unaware of the emergency.

Another problem with VoIP technology is that it is difficult at best to determine the geographic location of the emergency caller. The Federal Communications Commission is requiring mandatory location accuracy for various types of communication devices, such as VoIP devices, placing 911 calls. Knowing the electronic address of the emergency caller on the data network typically does not provide the physical location of the caller. Moreover, when VoIP communications are interrupted due to the condition of the caller and/or VoIP network the caller may have been unable to provide relevant information, such as in medical emergencies.

Other standardized services such as differentiated services (Diffserv) and virtual network segmentation (VLANs) can also be used to provide a guaranteed quality of service. These are specified in standard 802.1p/Q. Differentiated services allow for packets to be handled in a differentiated manner, thus allowing packets to be handled in different queues and allowing one type of service (TOS) priority over another. Unfortunately, the standardized serves do not provide for an "emergency" designation and the service type of similar services (for example VoIP calls) could be the same where one call should have precedence over another (a 911 call reporting a fire versus a call to recall last night's basketball game). VLANs allow traffic from a single endpoint to be handled as if it originated from multiple virtual endpoints. VLANS, however, do not indicate the precedence or relative priority of the "call" or traffic.

In telephony networks, MLPP (Multi Level Pre-emption Protocol or Multi-Level Precedence Protocol) provides a pre-emption method for signaled channelized circuit switched interfaces (ISDN). MLPP is used widely in military networks. Before ISDN interfaces had this capability, precedence was indicated in band for down stream switches to act on. Networks handling this approach are called "autovon" networks. These technologies however only apply to channelized networks and not packet networks. A preemption method has not been developed for packet-switched networks because in packet-switched networks no channels can be identified and dealt with as a permanent resource.

SUMMARY OF THE INVENTION

These and other needs are addressed by the various embodiments and configurations of the present invention. The method and architecture of the present invention can assign a preemption level to a communication or communication path. The preemption level can be used to allocate or reallocate intermediate node resources to support the communication or communication path.

In one embodiment, the preemption level causes at least some routers in a distributed processing network to process communications associated with the preemption level differently than other communications not having the preemption level. Typically, routers allocate/reallocate router resources to communications/communication paths having higher corresponding preemption levels and take away router resources from communications/communication paths having lower or no corresponding preemption levels. In this manner, the routers tear down existing (non-preemptive) reservations of protocols, such as RSVP, MultiProtocol Label Switching or MPLS and other quality of service protocols, to free resources for preemptive traffic. This is particularly important for crime and medical emergencies.

In another embodiment, the architecture uses a preemption map comprising a plurality of preemption levels (each preemption level being associated with predetermined level identification criteria) to assign the preemption level to the communication/communication path. The predetermined identification criteria depends upon the application.

In yet another embodiment, the architecture uses stored sender-specific information associated with a sender for incorporation into the communication for use by the intended recipient. Sender-specific information can include, for example, a person's name, a person's age, a preexisting medical condition, a drug allergy, a physical location of a structure, a physical location of a computational component such as a computer terminal. This information is particularly useful in crime or medical emergencies for location of the victim and/or dispatch of appropriate personnel.

The present invention can have a number of advantages. First, the architecture of the present invention can provide VoIP technology with a degree of reliability close to that of circuit-switched telephony in guaranteeing the availability of network resources for specific types of calls. Second, the architecture can provide location and other pertinent information to appropriate personnel to permit more rapid response to the emergency than is possible with circuit-switched telephony. The architecture can realize communication preemption without allocating only a portion of the router's resources to such communications. Such bandwidth segmentation can restrict unnecessarily the number of emergency communications that a node can handle.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
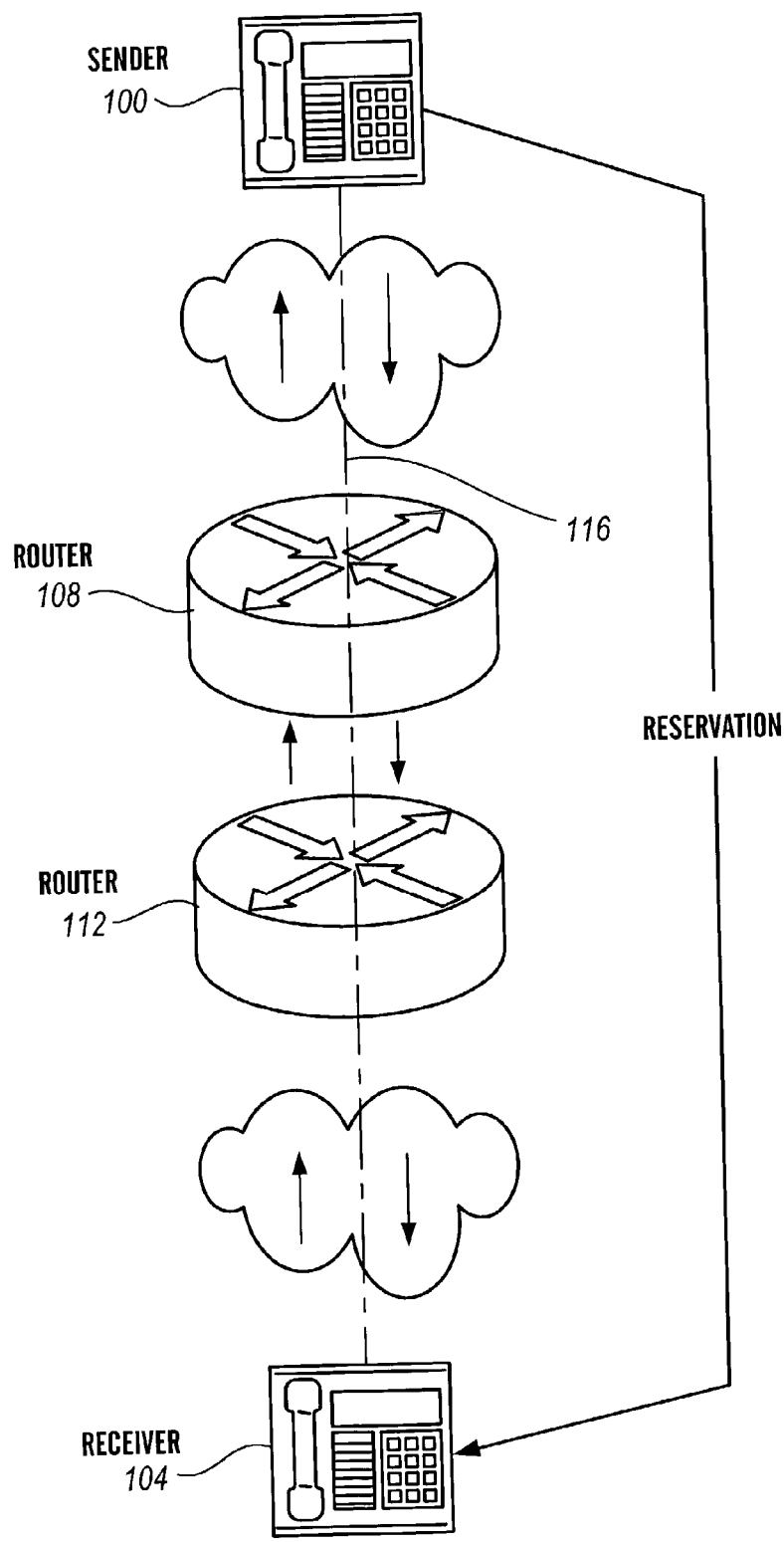
FIG. 1 is a block diagram depicting a prior art VoIP connection.
Figure 2:
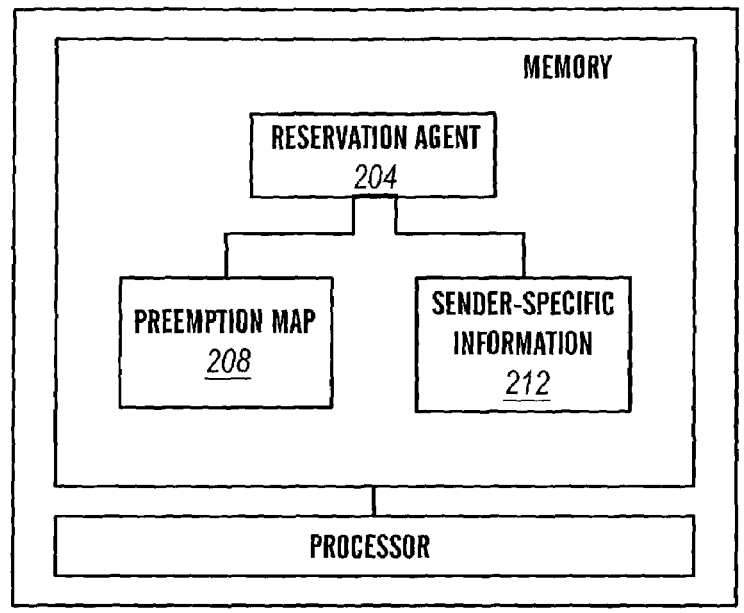
FIG. 2 is a block diagram depicting a source node according to an embodiment of the present invention.

Referring to FIG. 2, the source node 200 implementing an embodiment of the present invention will be discussed. The node 200 comprises a reservation agent 204 operable to assemble and configure RSVP path, pathtear, and reservation confirmation messages and evaluate reservation messages received from another network node, a preemption map 208 containing one or more preemption levels indexed by corresponding level identification parameters or criteria, and sender-specific information 212 associated with or related to the (human) sender operating the source node 200. The node can be implemented as any number of communication devices, such as a telephone, a soft phone, an IP hard phone, a personal computer, a PDA, a pager, a wireless phone, a component of an alarm or emergency system, and video camera or video surveillance.

In the preferred configuration, the reservation agent 204 identifies sender communications entitled to a preemption level, determines the pertinent preemption level for each such communication, retrieves sender-specific information for certain types of preemption levels, and constructs RSVP objects containing the preemption level and/or sender specific information in one or more packets corresponding to the communication for transmission to the receiver and intermediate routers. The RSVP objects may be included in the RSVP path, pathtear, and/or reservation confirmation messages.

The preemption map 208 is typically an array or table of preemption levels and corresponding identification criteria. The preemption levels are indicative of a degree of importance or ranking to be accorded the corresponding communications between the sender and receiver. Preemption levels can be indicative of one or more events. For example, the highest preemption level can be for a 911-(or 000-) type emergency, such as a medical emergency, a crime emergency, and the like. A second, lower preemption level can be service related, such as for a service call on a telephony device or service. Additional preemption levels can be used depending upon the application. For example, the map can use 0, 1, 2 and 3 as the values to represent the various preemption levels, with 0 being the highest. The corresponding identification criteria can be any suitable information input by the sender. For example, the criteria can be a telephone number or electronic network address of the receiver (such as 911 or 000), and a predetermined code or series of signals input or initiated by the sender (such as a keyed sequence, voice identification, DNA authentication, fingerprint authentication, and optic retinal scan authentication).

The sender-specific information 212 can be any information that is related to the sender and/or with an event associated with a preemption level. The information 212 can be implemented as a collection of information independent of preemption level or as a collection of information indexed or sorted by a corresponding preemption level. For example, for a preemption level corresponding with a crime or medical emergency the information can include the names, ages, and preexisting medical conditions or drug allergies of each person in the sender's household, the physical location of the sender's household (e.g., latitude, longitude, and/or altitude), the physical address of the sender's household, and any other information pertinent to the event associated with the preemption level. The sender-specific information is typically input by the sender and may be required for the source node to be enabled or as part of a provisioning process. Alternatively, the sender-specific information can be dynamically generated, a photo-scan, and/or a sensor reading of temperature, $CO_2$ level, CO level, radiation level, etc. These would be determined at the time of communication initiation.

Figure 3:
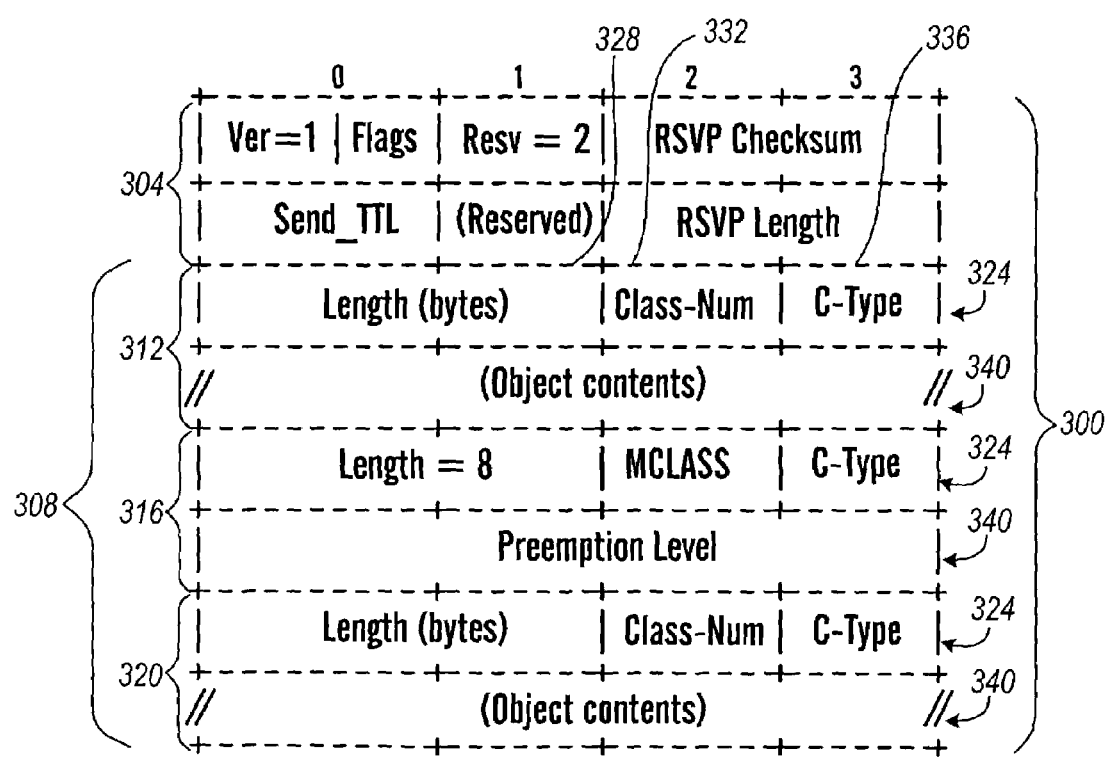
FIG. 3 is a diagram of a portion of an RSVP path message according to an embodiment of the present invention.

FIG. 3 depicts a portion 300 of a packet containing RSVP objects according to the present invention. The format of RSVP protocol messages is generally defined in RFC 2205. The packet comprises a standard RSVP header 304 and one or more protocol objects 308. The objects 308 may comprise (in any sequence or ordering) one or more standard RSVP objects such as a D class object (which conveys one or more Differentiated Services Code Point or DCSPs to a network node or host system where they are used to mark the traffic being produced for that RSVP flow), A first object 312 may be included before a Mandatory- or M-class object 316. The M-class object 316 conveys preemption level information. An Information or I-class object 320 contains sender-specific information appropriate for the preemption level in the M-class object 316. The contents of each object is generally a header 324 containing object length 328, an object class identifier 332, a class or C-Type value 336 (e.g., IPv4 or IPv6), and the object's contents 340. As shown in the M-class object 316, the length value of 8 provides a header 324 of 4 bytes in length and a length of the object's contents 340 that is 4 bytes or a multiple of 4 bytes. This allows the preemption level (priority) to be a number from 0 to 4,294,967,295. The value of the highest preemption level can be arbitrarily defined, such as 0 or 4,294,967,295. It is also possible to use fewer bits to represent the priority levels if four billion discrete levels is hard to manage. Eight bits (256 unique levels) may suffice and may be easier to support with real-time constraints.

The sender-specific information in the I-class object can be variable in length up to the maximum size allowable in an object (65528 bytes) and may be encoded based on the application's needs. For example, Unicode rather than ASCII text can be used to encode Japanese sender information.

The RSVP objects may be in any of the path, resv, resv tear, pathtear, and/or reservation confirm messages. In most implementations, the objects will be included in the initial message, which is generally the path request message or path message.

Figure 4:
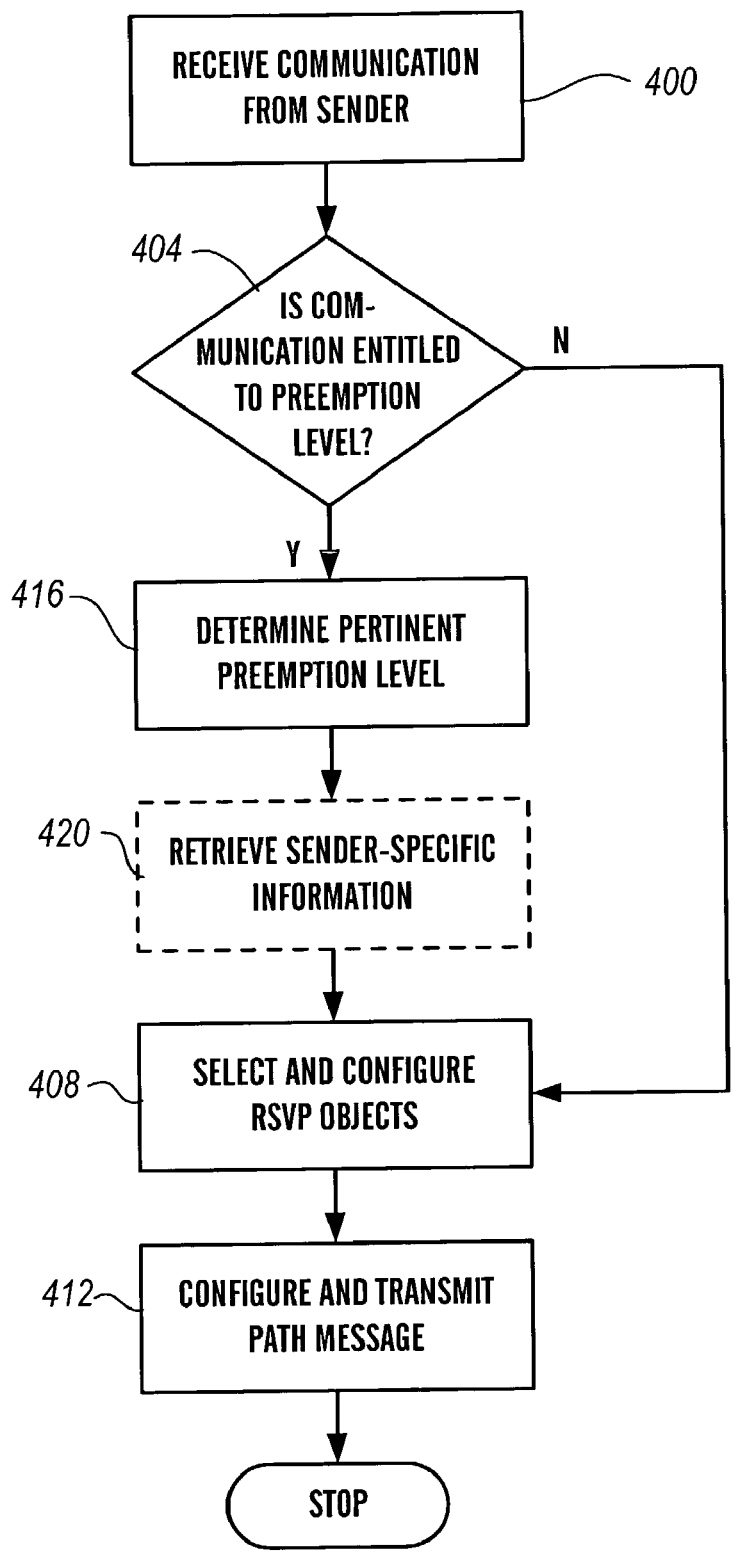
FIG. 4 is a flow chart of an embodiment of the operation of the source node of FIG. 2.

FIG. 4 depicts the operation of the source node 200 when the communication is received by the node 200 from the human sender. In step 400, the communication is received from the sender by any suitable technique. The communication may be input by depressing one or a series of keys or buttons, by speaking to the node (which would include voice recognition functionality to convert the spoken words into digital signals), by embedded VXML engines, and/or by a connection to an ASR/VXML engine.

In step 404, the reservation agent 204 analyzes the digital and/or analog signals received from the sender and determines whether or not the message is to be assigned a preemption level. This determination may be made by any suitable technique, such as by analyzing the destination address or telephone number, an access or authorization code, the contents of the communication itself (such as a symbol and/or an ordering of symbols), an alarm indication, and/or sensor threshold trigger. For example, the preemption entitlement of the communication can be signaled by one or more signals or digits before the telephone number.

When the communication is not entitled to a preemption level, the reservation agent 204 proceeds to step 408 (discussed below) to select and configure the pertinent standard or conventional RSVP objects and then to step 412 to configure and transmit the path message as a standard or conventional RSVP path message.

When the communication is entitled to a preemption level, the reservation agent 204 proceeds to step 416 where the reservation agent 204 determines the pertinent preemption level. This determination may be made by any suitable technique, such as by analyzing the destination address or telephone number, an access or authorization code, the contents of the communication itself (such as a symbol and/or an ordering of symbols), alarm indication, and/or sensor threshold trigger. For example, the preemption level of the communication can be signaled by one or more signals or digits entered before the telephone number.

In step 420, the agent 204 optionally retrieves predetermined types of sender-specific information for one or more I-class objects. The sender-specific information can be only for one or more selected preemption levels and/or may be different types of sender-specific information for different types of preemption levels. For example, a crime emergency request might require different sender-specific information than a medical emergency request. In another example, a crime or medical emergency request would require different sender-specific information than a request for maintenance and/or repair of a device or apparatus. Alternatively or additionally, the sender-specific information can be dynamically determined, such as by sensor readings, alarm information, and/or photoscan/still images.

In step 408, the agent 204 selects and configures the appropriate RSVP objects to be included in the path message. The objects selected will depend on the application and the type of event warranting preemption status for the communication. For example, some path messages will include only an M-class object, others both M-class and I-class objects, and yet others one or both of an M-class and I-class object along with a D class object.

In step 412, the agent 204 configures and transmits to the destination or receiver the path message containing the selected RSVP objects. The path message is then received by the first RSVP-aware node, which is typically a router, and processed before being transmitted to the next RSVP-aware node.

Figure 5:
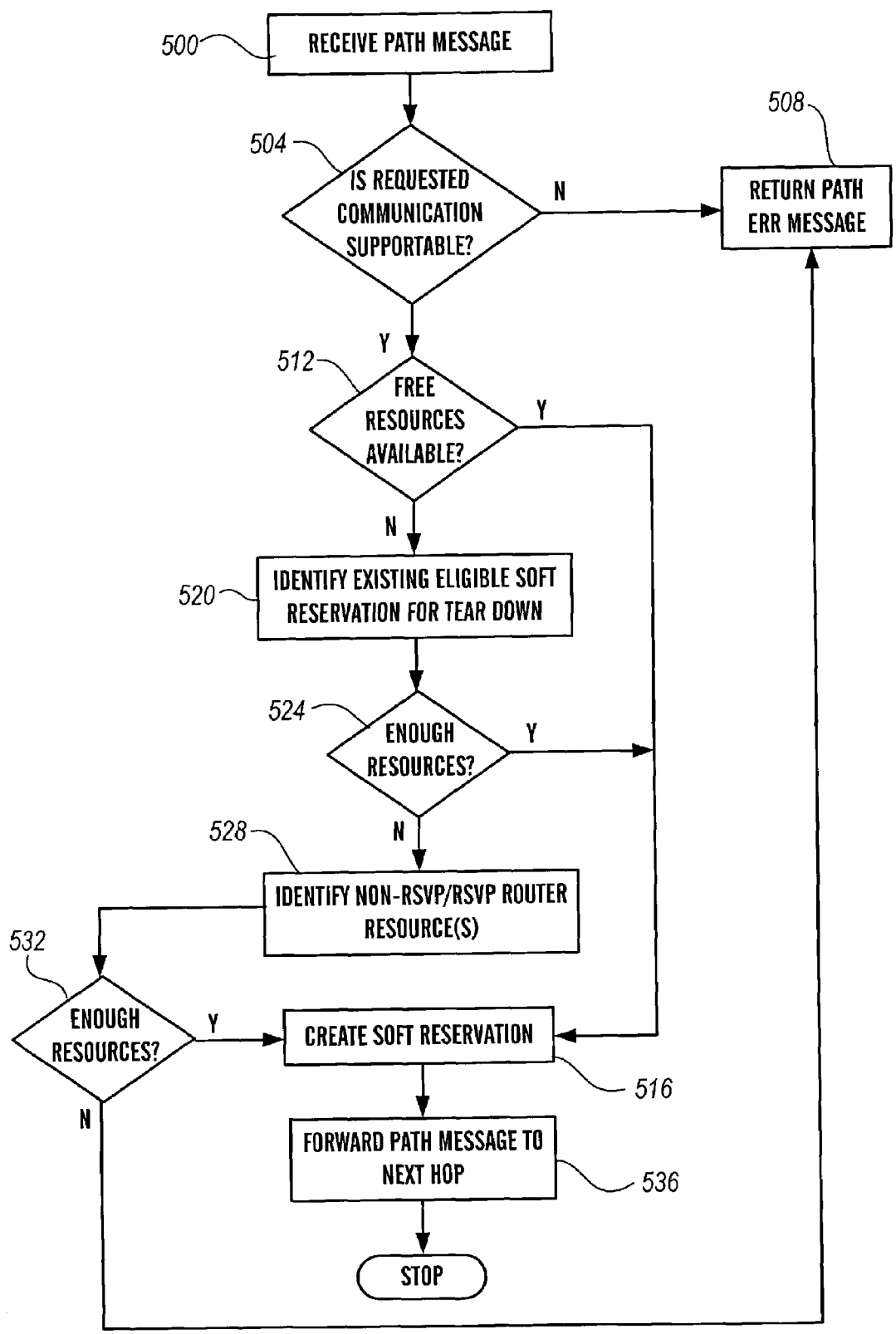
FIG. 5 is a flow chart of the operation of a router according to an embodiment of the present invention.

FIG. 5 depicts the processing of the path message by an RSVP-aware router after the router has received the path message in step 500. In decision diamond 504, the router determines whether the requested quality of service requirements or traffic specifications for the communication session are supportable. The router disregards existing RSVP sessions being handled by the router and, assuming that all resources of the router are free or unused, determines whether the router has the resources (e.g., bandwidth) to handle the session. When the router is unable to support the session, the router returns a path err or path error message in step 508. When the router is able to support the session, the router proceeds to step 512.

In step 512, the router determines whether there are sufficient free resources available to handle the quality of service requirements or traffic specifications for the session. This ensures that the router will disrupt as few existing sessions as possible in configuring the communication path for the new session.

When there are sufficient free resources, the router proceeds to step 516 (discussed below).

When there are not sufficient free resources, the router in step 520 identifies existing eligible soft reservations for tear down. "Soft reservations" are reservations for which a path request message has established soft state but for which the corresponding resv message has not yet been received. Generally, the router will identify for tear down first nonpreemptive soft reservations and, if there are still insufficient resources, second preemptive soft reservations of a lower (or less urgent) preemption level.

The router in step 524 then determines if the free resources and eligible soft reservation resources will provide sufficient quality of service requirements or traffic specifications for the session. When sufficient resources exist, the router proceeds to step 516 (discussed below), and, when sufficient resources do not exist, the router proceeds to step 528.

In step 528, the router identifies for tear down first non-RSVP and second RSVP resources that are in use until sufficient resources are available for the session. Typically if tearing down eligible non-RSVP resources (that will not impede the safe operation of the router) will not release sufficient resources for the session, the router will examine first nonpreemptive RSVP resources and second preemptive RSVP resources corresponding to a lower preemption level to identify sufficient RSVP resources for tear down. In some applications, the ordering is different. For example, the router may consider first nonpreemptive RSVP resources, second non-RSVP resources, and third preemptive RSVP resources. Other orderings are possible depending on the application.

In decision diamond 532, the router determines for a second time whether there are sufficient resources for the session. When insufficient resources exist, the router proceeds to step 508 and sends a path err message. The path err message contains an error code describing the cause of the failed installation. The error codes are set forth in RFC 2205. When sufficient resources exist, the router proceeds to step 516 and creates a soft reservation for the session. The soft reservation will time out if it is not used. The router also establishes a record of the previous RSVP-aware node the path message came from and composes information relating to the quality of service characteristics that the router is able to offer for the session.

In step 536, the router forwards the path message to the next hop interface. This process continues router-by-router until the path message arrives at the receiver.

Routers that do not support the RSVP protocol are transparent to the RSVP protocol and are not included in calculations of path characteristics. RSVP protocol packets pass through RSVP-unaware devices unhindered. Because the RSVP signaling and traffic it protects are distinct, an RSVP-protected flow can pass through routers that the RSVP protocol did not calculate into the path metrics. These non-RSVP-capable routers in the path can perturb or compromise the quality of service provided to the RSVP-protected traffic.

Figure 6:
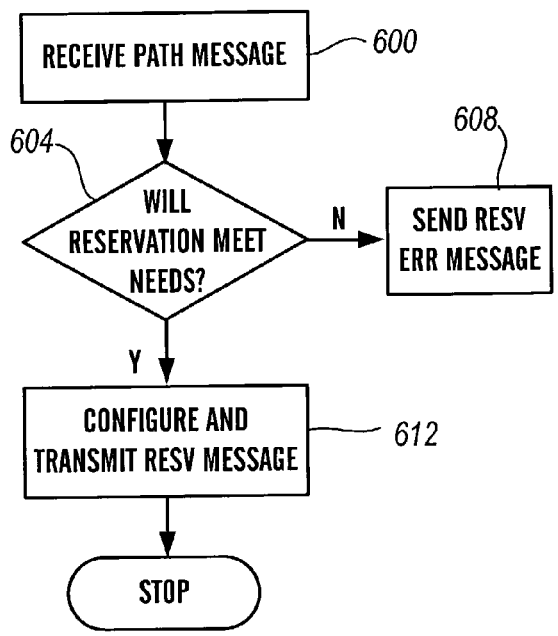
FIG. 6 is a flow chart of the operation of the receiving node according to an embodiment of the present invention.

FIG. 6 shows the processing of the path message by the receiver when the message is received in step 600. Although the sender-initiated path message creates a soft state reservation along the path to the receiver, the receiver initiates the reservation if the path message indicates that the receiver's path requirements can be met.

Accordingly, in step 604 the receiver examines the path message and the soft reservation at each RSVP-aware node and determines whether the reservation will meet the needs of the path request in the path message. If not, the receiver sends in step 608 a reservation error or resv err message back to the source node. The resv err message contains an error code describing the cause of the failed installation. If so, the receiver configures and transmits in step 612 to the source node a reservation or resv message.

Part of the path soft state established at each router when the path message was processed by the router is the address of the previous RSVP-aware hop interface. Using this information, the resv message is relayed hop-by-hop, in the reverse order that the path message took, back to the source node.

Figure 7:
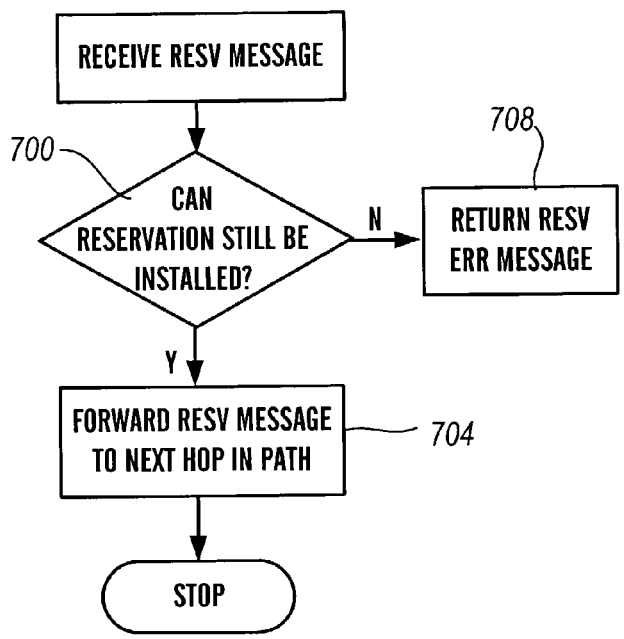
FIG. 7 is a flow chart of the operation of the router according to an embodiment of the present invention.

As shown in FIG. 7, each RSVP-aware router in step 700 verifies that the reservation can still be installed and, if the reservation can still be installed, in step 704 the resv message is forwarded to the next hop interface in the path. To verify that the reservation can still be installed, the router typically checks the request against the policy that has been set for the application corresponding to that flow on that network element and, if the request is deemed acceptable, admission control (or checking of the reservation against the available bandwidth) verifies that the quality of service requested can be met by that network node. If the reservation cannot still be installed, the router in step 708 sends a resv err message back to the receiver.

Figure 8:
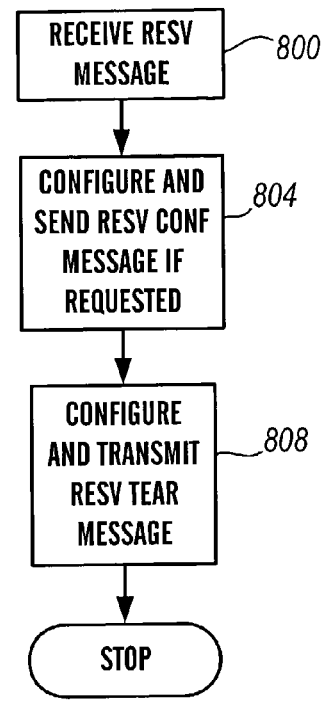
FIG. 8 is a flow chart of the operation of the source node according to an embodiment of the present invention.

The receiver may ask for a confirmation message or resv conf message when the resv message is initially sent. Referring to FIG. 8, after the resv message is received by the source node in step 800, the agent 204 in step 804 generates the resv conf message that satisfies the reservation request and sends the message back to the receiver.

Depending on the configuration, a reservation tear or resv tear message is issued from the receiver to the source node in step 808 to tear down reservations at all RSVP-aware intermediate nodes in the path or a path tear message is issued from the source node to perform the same function.

During subsequent packet flow in the session, each RSVP-aware router performs flow classification by matching packet destination IP address, destination port, and protocol type to the installed reservation. Packets that are matched must be treated preferentially so long as the traffic flow does not exceed the traffic specification of the installed reservation. The volume of traffic that exceeds the reservation is typically downgraded to best effort status and will be subject to packet loss, delay, and jitter prevalent on the interface after being downgraded.

Although the potential to use preemption levels to disrupt or deny service in an RSVP network is great, RSVP defines an INTEGRITY object that accompanies RSVP path and resv messages that is used to authenticate RSVP messages. This authentication mechanism may be used by the RSVP-aware elements in the network (e.g., the gatekeeper or gateway) to determine if a request (particularly on M-class object) is genuine.

A number of variations and modifications of the invention can be used. It would be possible to provide for some features of the invention without providing others.

For example in one alternative embodiment, the reservation can be installed by each intermediate node as the path message is sequentially transmitted by the nodes to the receiver. In other words, existing RSVP- and nonRSVP-resources, whether free or in use, would be configured for the session to permit the session (or communication between two or more entities) to proceed without further messages, such as an resv message, to be sent by the receiver. In this embodiment, there would be no "soft state" or soft reservations. Rather, there would only be an installed reservation state in existence at each intermediate node immediately after the path message is processed. Despite the intrusiveness of this approach on existing sessions, this configuration may be desirable for high level preemptions, such as for crime or medical emergencies. Lower level preemptions can use the approach set forth in FIGS. 4-8.

In another alternative embodiment, the session would be initiated even if a path err or resv err message is received by a node. Even though the message(s) may be only partly intelligible, the message(s) may nonetheless provide to the recipient enough information to respond to the event associated with the preemptive communication. This embodiment is attractive in crime and medical emergency situations.

In another alternative embodiment, the subject invention is used for applications other than a medical or crime emergency and/or VoIP technology. The invention can be used in non-emergency specific situations, such as when there is a need for service level discrimination on a shared network with finite resources. The invention can be used with pagers, alarm information, and home health emergency alarm systems to name but a few. Telephony is but one example of an application that can be benefitted by the present invention.

In yet another alternative embodiment, the invention is used with any lower-OSI layer network bandwidth reservation scheme, such as RSVP, Differentiated Services or DiffServ, ITU Recommendation H.323, ITU Recommendation H.248, or SIP, MultiProtocol Label Switching or MPLS, Asynchronous Transfer Mode or ATM, and combinations thereof. The invention can be used for any bandwidth allocation scheme in which an endpoint application (telephone, pager, emergency button, etc.) preempts and allocates bandwidth on intervening network equipment.

In one embodiment, the invention is used with any integrated service model of RSVP, such as controlled load and guaranteed service.

In another embodiment, the path message could install the soft state reservations at each RSVP-aware intermediate node, and the resv message would actually install the reservation and cause the removal of the other eligible reservations at each such node in the reserved path.

In yet another embodiment, the receiver would take the sender-specific information in the I-class object and forward the information to a suitable servicing entity, such as the police and/or hospital.

In yet another alternative embodiment, the RSVP aware router in step 504 of FIG. 5 and/or the source node or receiver can, when the RSVP-aware router cannot support the session, attempt to identify another communication path involving one or more different routers for the session. This embodiment mimics the concept of "crank back" used in other protocols, such as ATM. The alternative path would not ordinarily be identified by the routing protocol due to the protocol's functionality.

In yet another alternative embodiment, the present invention is used with a security or alarm system. The path message is generated when a button is pressed. In one configuration, the receiver then activates a microphone and eavesdrop on the sender's location prior to or after emergency personnel are dispatched to the location.

In yet another embodiment, the present invention is used by a service provider or vendor when a malfunction is detected. A preemption level is provided to the detection message and forwarded to an appropriate entity for dispatching personnel to repair the malfunction on a rapid basis.

In yet a further embodiment, the preemption level information is included in a plurality of packets from the session rather than just in the initial path message. This permits the source node to mark only certain packets with a certain preemption level and other packets with no or a lower preemption level. In yet a further embodiment, the preemption mapping is similar to that for the Multi-Level Preemption Protocol or MLPP. As will be appreciated, MLPP is used in circuit-switched telephony networks to assign a preemption level to a telephone call. The assignment is performed by entering DTMF codes in front of the telephone number. By making the preemption levels the same, the architecture of the present invention can be used with MLPP networks, or with supplementary information elements in an Integrated Services Digital Network or ISDN message.

In yet another embodiment, the present invention is used not only in packet-switched but also circuit-switched networks and in both connection-oriented and connectionless services and can be implemented, in whole or part, as an application specific integrated circuit.

In yet another embodiment, telephony signaling (e.g., SIP or H.323) is used to initiate M-class reserved traffic.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    receiving a communication from a sender, the destination being intended for a destination address;
    based on the destination address, assigning a first preemption level to at least one of a first packet associated with the communication and a first communication path associated with the first packet, wherein the first preemption level causes at least some routers in the distributed processing network to process the first packet differently than other packets not having the first preemption level;
    determining based on the communication that the first packet is entitled to the first preemption level, wherein the destination address is associated with an emergency service provider, and wherein the first preemption level applies only to packet-switched voice communications to specified destination addresses, the specified destination addresses comprising the communication's intended destination address; and
    configuring and incorporating into the first packet at least one I-class object, the I-class object being included in the body of the first packet and comprising a plurality of the following: the sender's name, the sender's age, the sender's preexisting medical condition, the sender's drug allergies, a physical location of the sender's household, a physical address of the sender's household, a video image, a condition of a device associated with the sender, and a detected parameter associated with the sender.

2. The method of claim 1, wherein the assigning step comprises:
comparing at least a portion of the communication with a preemption map to determine the corresponding preemption level for the at least one of the first packet and first communication path.

3. The method of claim 1, wherein the information in the I-class object is unrelated to a communication device of the sender.

4. The method of claim 1, further comprising:
configuring and incorporating into the first packet at least one M-class object, the M-class object being included in the body of the first packet and comprising an identifier of the first preemption level.

5. The method of claim 1, wherein the first packet is at least part of a path request message and wherein the first preemption level is not used for a second later packet that is transmitted by the sender as part of the same session with the destination address.

6. A method for routing packets in a distributed processing network, comprising:
(a) receiving at a router a first packet having a first preemption level;
(b) identifying at least one of an unused and in-use router resource having at least one of no corresponding preemption level and a different corresponding preemption level for use by at least one of the first packet and a first communication path associated with the first packet, wherein the router resources available for use for the at least one of the first packet and a first communication path associated with the first packet are independent of bandwidth segmentation and wherein the identifying step comprises the sub-steps:
(B1) first identifying unused router resources for use by the at least one of the first packet and the first communication path; and
(B2) when the unused router resources are inadequate to support the at least one of the first packet and the first communication path, second identifying router resources currently in use for use by the at least one of the first packet and the first communication path; and
(c) using first unused and, as needed, second in-use router resources used in existing lower preemption communication sessions to provide router resources for the at least one of the first packet and a first communication path associated with the first packet.

7. The method of claim 6, wherein the first preemption level is associated with a destination address and further comprising:
when the first communication path is unsupportable by the router, sending an error message to a source of the first packet; and
when the first communication path is supportable by the router, performing the identifying step.

8. The method of claim 6, wherein the second identifying step comprises:
comparing the first preemption level with a second preemption level associated with at least one of a second packet and a second communication path currently using at least a second router resource;
when the first preemption level has a higher priority than the second preemption level considering the at least a second router resource for use by the at least one of the first packet and the first communication path; and
when the first preemption level has a lower priority than the second preemption level excluding the at least a second router resource from consideration for use by the at least one of the first packet and the first communication path.

9. The method of claim 6, wherein the at least one of the first packet and a first communication path associated with the first packet is the first communication path and wherein the first packet is transmitted even though the first communication path is unsupportable by the router.

10. The method of claim 9, wherein the first packet is associated with a contact to an emergency service provider and further comprising:
configuring and forwarding at least a second packet associated with the at least one of the first packet and the first communication path to a next hop interface.

11. The method of claim 6, further comprising:
disrupting the current use of the identified in-use router resources for use by the at least one of the first packet and the first communication path.

12. A method, comprising:
assigning a preemption level to a first signal associated with a contact by a sender to an emergency service provider;
retrieving sender-specific information from memory, the sender-specific information being unrelated to a communication device of the sender;
incorporating the retrieved sender-specific information into the first signal; and
transmitting the first signal to an intended recipient, wherein the assignment of the preemption level is based on a sender inputted code, wherein the contact is a live voice contact, wherein the preemption level is higher than a preemption level used for a non-emergency contact, and wherein the sender-specific information is associated with a sender and comprises a plurality of a person's name, a person's age, a preexisting medical condition, a drug allergy, a physical location of a structure, a video image, a condition of a device, and a detected parameter.

13. The method of claim 12, wherein the first signal, after the incorporating step, comprises:
a header; and
a body comprising a preemption level, the preemption level being associated with at least one of a sender-inputted code and a destination address for the packet.

14. The method of claim 13, wherein the header comprises at least one of an object length, an object class identifier, and a C-type value.

15. The method of claim 13, wherein the body comprises at least one M-class object associated with the preemption level and at least one I-class object comprising sender-specific information.

16. The method of claim 15, wherein the sender-specific information comprises a physical location of a structure associated with the sender.

17. The method of claim 15, wherein the sender-specific information is unrelated to a communication device of the sender.

18. A source node, comprising:
an input port for receiving, from a sender, a communication intended for a destination address; reservation means for (a) assigning a first preemption level, based on a destination address, to a first communication path associated with a first packet, wherein the first preemption level causes at least some routers in the distributed processing network to process the first packet differently than other packets on a second communication path not having the first preemption level, and wherein the first packet is associated with the communication; (b) determining that the first communication path is entitled to the first preemption level, wherein the destination address is associated with an emergency service provider; (c) configuring and incorporating into the first packet at least one I-class object, the I-class object being included in the body of the first packet and comprising a plurality of the following: the sender's name, the sender's age, the sender's preexisting medical condition, the sender's drug allergies, a physical location of the sender's household, a physical address of the sender's household, a video image, a condition of a device associated with the sender, and a detected parameter associated with the sender.

19. The source node of claim 18, wherein the assigning means comprises:
 means for comparing at least a portion of the communication with a preemption map to determine the corresponding preemption level for the at least one of the first packet and first communication paths.

20. The source node of claim 18, wherein the information in the I-class object is unrelated to a communication device of the sender.

21. The source node of claim 18, further comprising:
 means for configuring and incorporating into the first packet at least one M-class object, the M-class object being included in the body of the first packet and comprising an identifier of the first preemption level.

22. The source node of claim 18, wherein the first packet is at least part of a path request message and wherein the first preemption level is not used for a second later packet that is transmitted by the sender as part of the same session with the destination address.

23. A source node, comprising:
 an input port configured to receive a communication from a first user;
 a reservation agent configured to:
  (a) assign a first preemption level to a first packet, wherein the first packet is associated with a communication from the first user, wherein the first preemption level causes at least some routers in the distributed processing network to process the first packet differently than other packets not having the first preemption level, wherein the reservation agent determines, based on the communication, that the first packet is entitled to the first preemption level, wherein the assignment of the first preemption level to the first packet is based, at least in part, on a destination address of a communication device associated with a second party, wherein the first packet is associated with a voice communication between the first user and second party, and wherein the first preemption level applies only to a subset of voice communications; and
  (b) configure and incorporate into the first packet an object, the object being included in the body of the first packet and comprising a plurality of the following: the first user's name, the first user's age, the first user's preexisting medical condition, the first user's drug allergies, a physical location of the first user's household, a physical address of the first user's household, a video image, a condition of a device associated with the first user, and a detected parameter associated with the first user.

24. The source node of claim 23, wherein the at least one of an inputted code and/or destination address is the destination address, wherein the second party is an emergency service provider, wherein the first preemption level applies only to packet-switched voice communications to specified destination addresses, wherein the reservation agent is configured to compare at least a portion of the communication with a preemption map to determine the preemption level corresponding to the at least one of the first packet and first communication path, and wherein the at least a portion of the communication is the destination address.

25. The source node of claim 23, wherein the object is unrelated to a communication device of the first user.

26. The source node of claim 23, wherein the assignment of the first preemption level is based, at least in part, on the code, wherein the code is associated with the activation of at least one activator, and wherein the reservation agent is operable to configure and incorporate into the first packet at least one M-class object, the M-class object being included in the body of the first packet and comprising an identifier of the first preemption level.

27. The source node of claim 25, wherein the object is an I-class object.

28. The source node of claim 23, wherein the first packet is at least part of a path request message and wherein the first preemption level is not used for a second later packet that is transmitted by the first user as part of the same session with the destination address.

29. The source node of claim 23, further comprising:
 a preemption map, the preemption map comprising a plurality of preemption levels, each preemption level being associated with predetermined level identification criteria and a selected type of communication having a plurality of possible preemption levels depending on the applicable identification criteria.

30. A method for routing packets in a distributed processing network, comprising:
 (a) receiving at a router a first packet having a first preemption level;
 (b) identifying at least one of unused and in-use router resources having at least one of no corresponding preemption level or a different corresponding preemption level for use by at least one of the first packet and a first communication path associated with the first packet, wherein the identifying step comprises the substeps:
  (b1) first identifying unused router resources for use by the at least one of the first packet and the first communication path; and
  (b2) when the unused router resources are inadequate to support the at least one of the first packet and the first communication path, second identifying router resources currently in use for use by the at least one of the first packet and the first communication path and wherein the second identifying step (b2) comprises the further substeps:
   (b2A) comparing the first preemption level with a second preemption level associated with at least one of a second packet and a second communication path currently using at least a second router resource;
   (b2B) when the first preemption level has a higher priority than the second preemption level considering the at least a second router resource for use by the at least one of the first packet and the first communication path; and
   (b2B) when the first preemption level has a lower priority than the second preemption level excluding the at least a second router resource from consideration for use by the at least one of the first packet and the first communication path.

31. A source node for configuring and transmitting packets, comprising:
   an input port for receiving a communication from a sender; and
   reservation means for (a) assigning a first preemption level to a first communication path associated with a first packet, wherein the first preemption level causes at least some routers in the distributed processing network to process the first packet differently than packets on other communication paths not having the first preemption level, wherein the first packet is associated with the communication from a sender; (b) determining based on the communication that the first communication path is entitled to the first preemption level, wherein the determining function comprises comparing at least a portion of the communication with a preemption map to determine the corresponding preemption level for the first communication path; and (c) incorporating sender-specific information into the first packet, the sender-specific information being unrelated to a communication device of the sender and comprising a plurality of the following: the sender's name, the sender's age, the sender's preexisting medical condition, the sender's drug allergies, a physical location of the sender's household, a physical address of the sender's household, a video image, a condition of a device associated with the sender, and a detected parameter associated with the sender.

32. A source node for configuring and transmitting packets, comprising:
   an input port configured to receive the communication from a sender; and
   a reservation agent configured to:
   (a) assign a first preemption level to a first packet, wherein the first preemption level causes at least some routers in the distributed processing network to process the first packet differently than other packets not having the first preemption level, wherein the first packet is associated with a communication from a sender;
   (b) determine, based on the communication, that the first packet is entitled to the first preemption level by comparing at least a portion of the communication with a preemption map to determine the preemption level corresponding to the first packet; and
   (c) incorporate sender-specific information into the first packet. the sender-specific information comprising a plurality of the following: the sender's name, the sender's age, the sender's preexisting medical condition, the sender's drug allergies, a physical location of the sender's household, a physical address of the sender's household, a video image, a condition of a device associated with the sender, and a detected parameter associated with the sender.

33. The source node of claim 32, wherein the sender-specific information is unrelated to a communication device of the sender, wherein the first packet is associated with a voice communication between the sender of the source node and a second party, wherein the first preemption level applies only to a subset of voice communications, wherein the second party is an emergency service provider, wherein the first preemption level applies only to packet-switched voice communications to specified destination addresses, and wherein the at least a portion of the communication is the destination address.

34. The source node of claim 32, wherein the sender-specific information is unrelated to a communication device of the sender and comprises one or more of a physical location of the sender's household, a physical address of the sender's household, and a detected parameter associated with the sender.

35. The source node of claim 32, wherein the first packet is at least part of a path request message and wherein the first preemption level is not used for a second later packet that is transmitted by the sender as part of the same session with the destination address.

36. The source node of claim 32, further comprising:
   a preemption map, the preemption map comprising a plurality of preemption levels, each preemption level being associated with predetermined level identification criteria and a selected type of communication having a plurality of possible preemption levels depending on the applicable identification criteria.

* * * * *